United States Patent [19]

Yonezawa et al.

[11] Patent Number: 5,063,648
[45] Date of Patent: Nov. 12, 1991

[54] APPARATUS AND METHOD FOR REPLACING WORKING-OBJECT OF PROCESSING MACHINE

[75] Inventors: Keitaro Yonezawa; Ichiro Miyata; Tsutomu Shirakawa, all of Amagasakishi, Japan

[73] Assignee: Kabushiki Kaisha Kosmek, Amagasakishi, Japan

[21] Appl. No.: 440,315

[22] Filed: Nov. 22, 1989

[30] Foreign Application Priority Data

Nov. 29, 1988 [JP] Japan .................. 63-156342[U]
Nov. 29, 1988 [JP] Japan .................. 63-303334

[51] Int. Cl.5 .............................................. B29F 1/00
[52] U.S. Cl. ........................................ 29/33 K; 29/568;
72/446; 83/563; 414/499; 425/185; 425/190;
100/918
[58] Field of Search .............. 29/565, 33 P, 568, 33 K;
198/346.1; 425/185, 190; 100/918; 414/280,
281, 345, 499, 527, 661; 72/446, 448; 83/563

[56] References Cited

U.S. PATENT DOCUMENTS

| | | | |
|---|---|---|---|
| 4,555,228 | 11/1985 | Nishiike et al. | 425/185 |
| 4,597,709 | 7/1986 | Yonezawa | 414/499 X |
| 4,705,445 | 11/1987 | Morita et al. | 198/346.1 X |
| 4,737,095 | 4/1988 | Hehl | 425/190 |

FOREIGN PATENT DOCUMENTS 0158781 12/1979 Japan ................... 29/33 P
61-47611 3/1986 Japan .

Primary Examiner—Z. R. Bilinsky
Attorney, Agent, or Firm—Bacon & Thomas

[57] ABSTRACT

In an apparatus and a method for replacing a working-object of a processing machine, there are provided a working-object replacing support (6), a working-object moving passage (12) and a push/pull drive means (18) for the working-objects (5a)(5b).

The push/pull drive means (18) is provided with a push-/pull drive device (19), a push/pull engaging member pedestal (20), a push/pull transmission member (21), a guide rail (22) and a push/pull engaging member (23).

An engaging portion (59) of the engaging member (23) is adapted to be shifted to a position lower than height positions of lower surfaces of engaged portions (25)(26) of the working-objects (5a)(5b) under the changed over condition to the disengagement position (Y) and at least to face upward so as to be engaged with the engaged portions (25)(26) from below under the changed over condition to the engagement position (X).

6 Claims, 10 Drawing Sheets

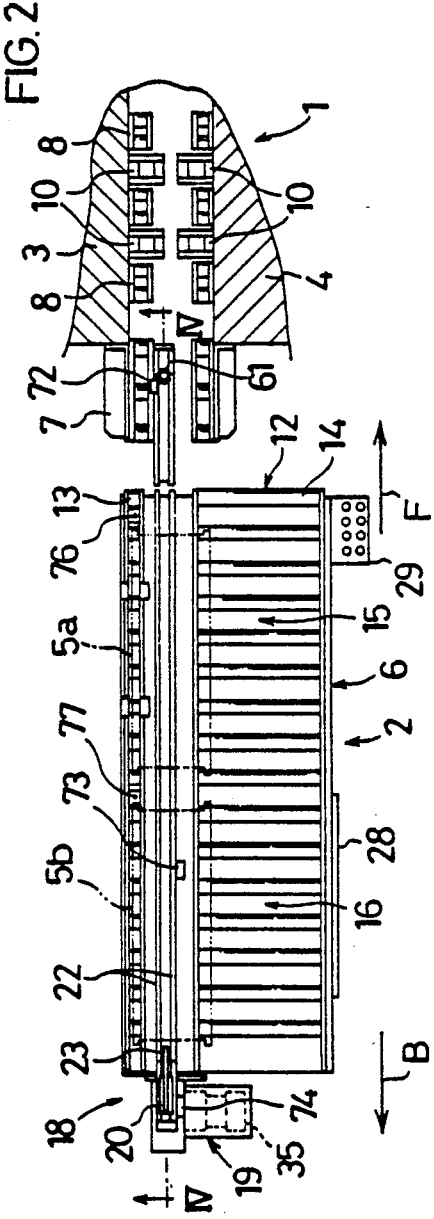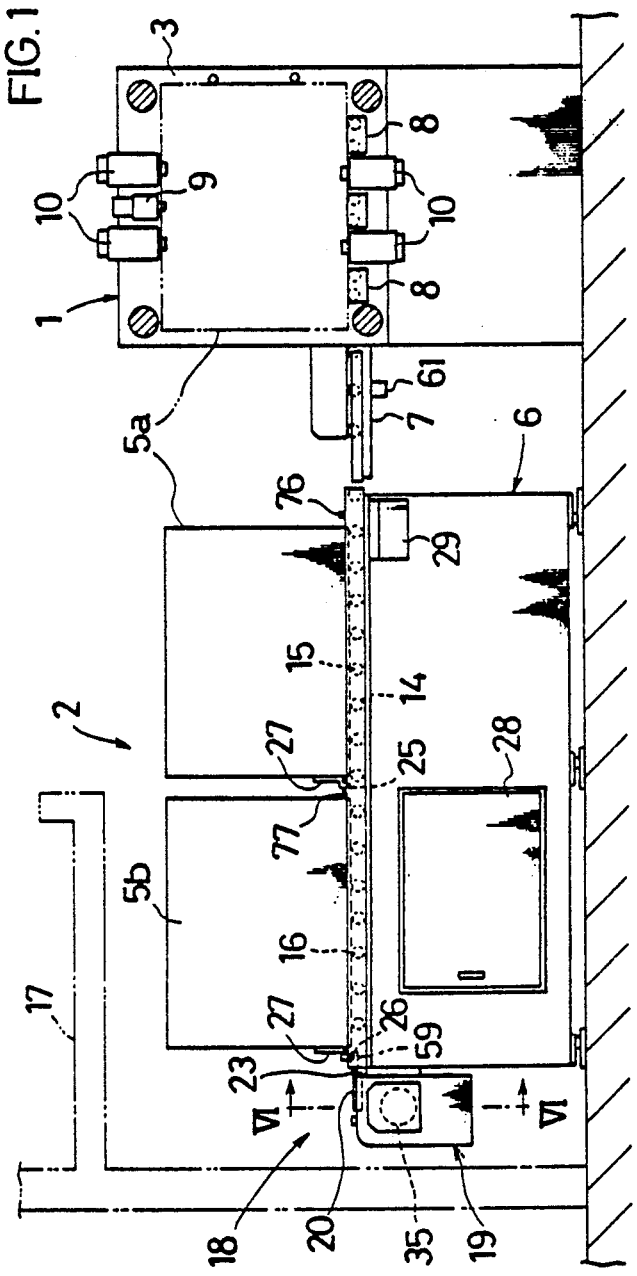

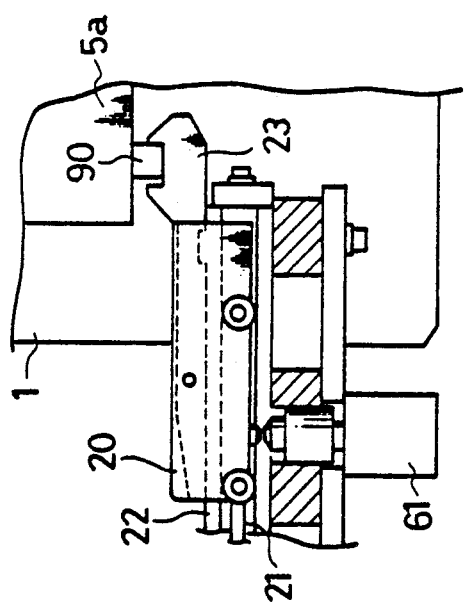
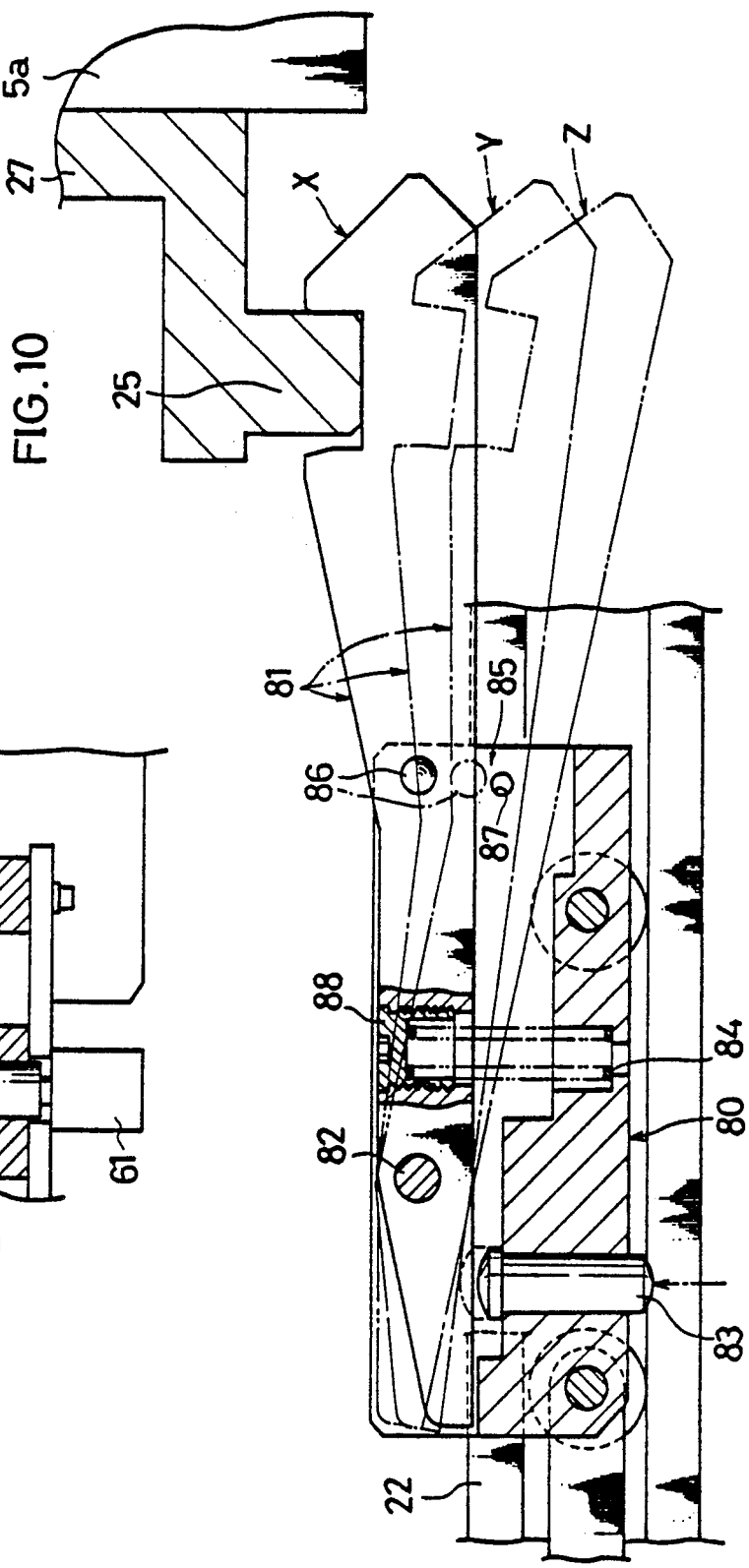

APPARATUS AND METHOD FOR REPLACING WORKING-OBJECT OF PROCESSING MACHINE

BACKGROUND OF THE INVENTION

1. Field of the Invention

The present invention relates to an apparatus and a method for replacing a working-object such as a metal mold, a work pallet and the like for a processing machine such as an injection molding machine, a press machine, a machining center and so on.

2. Description of the Prior Art

Such an apparatus for replacing a working-object of a processing machine is disclosed, for instance in a conventional embodiment as shown in FIGS. 19 through 21 (refer to Japanese Provisional Utility Model Publication No. 1986-47611) and has a following basic construction.

That is, a metal mold replacing apparatus 302 of an injection molding machine 301 as a processing machine comprises a working-object replacing support 306 on which working-objects 304, 305 can be placed, working-object moving passages 312, 313 arranged on the replacing support 306 so as to extend in the fore and back direction and push/pull drive means 317, 318 for pushing and pulling the respective working-objects 304, 305 in the fore and back direction (in the direction indicated by arrows F, B) so as to bring in and bring out them with respect to the injection molding machine 301.

Each push/pull drive means 317, 318 comprises a push/pull drive device 319, a push/pull engaging member pedestal 320, a push/pull transmission member 321 composed of a bendable storable chain, a guide rail 322 provided for guiding the pushing and the pulling of both the push/pull transmission member 321 and the engaging member pedestal 320 and a push/pull engaging member 323 supported by the engaging member pedestal 320.

The push/pull drive device 319 is fixedly secured to the back portion of the replacing support 306 and adapted to drive the engaging member pedestal 320 in the fore and back direction through the push/pull transmission member 321. The engaging member 323 is movable so as to be changed over between the engagement position where it is engaged with respective engaged portions 325 of the metal molds 304, 305 and the disengagement position where the engagement thereof is cancelled.

In the above-mentioned basic construction, conventionally the portion for engaging and disengaging the engaging portion 359 of the engaging member 323 with respect to the respective engaged portions 325 is constructed as follows.

That is, the respective metal molds 305, (304) are provided at their lower portions with the engaged portions 325 composed of upward opened grooves and projected horizontally. The engaging member 323 is supported vertically pivotably by the engaging member pedestal 320 and is provided at its foreside end with the engaging portion 359 projected downward. The engaging portion 359 is adapted to be engaged with and disengaged from the engaged portion 325 from above.

There are, however, following problems associated with the above-mentioned conventional embodiment.

For example, when the metal molds 304, 305 are brought in and brought out with respect to metal mold receiving surfaces 315, 316 by utilizing an overhead travelling crane or a fork lift, it is apprehended that the engaging member pedestal 320 and the engaging member 323 are damaged by the engaged portions 325 of the metal molds 304, 305 swung and brought into contact therewith during the lifting up because the engaging member pedestal 320 and the engaging member 323 are projected upward from the upper surface of the replacing support 306. Therefore, the operations of the crane and the fork lift become complicated, and the replacement of the metal mold is troublesome.

In order to prevent the engaging member pedestal 320 and the engaging member 323 from being conflicted with the metal mold and the engaged portion 325 thereof when the metal mold is placed onto the metal mold replacing support 306 by means of the crane and the like, it is necessary to retreat both the engaging member pedestal 320 and the engaging member 323 behind the metal mold replacing support 306. Therefore, since the metal mold replacing support 306 has to be made longer corresponding to the retreating distance, it becomes large in size and heavy in weight.

Further, according to the conventional embodiment, the distance L between the height position where the guide rail 322 guides the engaging member pedestal 320 and the height position where the engaging member 323 engages with the engaged portion 325 is large. Therefore, the moment disposed to turn the engaging member pedestal 320 in the vertical direction relative to the guide rail 322 becomes large due to the reaction force produced when the metal mold is pushed and pulled thereon. As a result, the guide rail 322 is required to have a sufficient strength bearable against the large moment, and further the metal mold replacing support 306 becomes larger in size and heavier in weight.

SUMMARY OF THE INVENTION

It is an object of the present invention to facilitate the replacing working of a working-object such as a metal mold and the like and to make a working-object replacing support small in size and light in weight.

For accomplishing the above-mentioned object, the present invention is characterized in that the above-mentioned basic construction is improved as follows.

That is, the engaging portion of the engaging member to be changed over between the engagement position and the disengagement position with respect to the engaged portion of the working-object is adapted to be located below the height position of the engaged portion under the changed over condition to the disengagement position and also to face upward at least under the changed over condition to the engagement position so as to be engaged with the engaged portion from below.

According to the aforementioned construction, the following advantages can be provided.

Since the engaging member can be located below the engaged portion of the working-object by the change-over to the disengagement position, the engaged portion can be prevented from conflicting with the engaging member even though the working-object swings when the working-object is placed onto the working-object receiving surface by means of the crane and the like. Accordingly, it becomes easy to operate the crane and the like, and correspondingly the working-object replacing working doesn't take a trouble.

Since it is unnecessary to retreat the engaging member pedestal behind the metal mold replacing support in order to prevent the conflict between the engaged portion and the engaging member differently from the conventional embodiment, the replacing support can be shortened corresponding to the distance required for the retreat in the conventional embodiment. Accordingly, the replacing support can be made small in size and light in weight.

Further, since the distance between the height position where the guide rail guides the engaging member pedestal and the height position where the engaging member engages with the engaged portion can be shortened because the engaging portion is adapted to be engaged with the engaged portion from below, it becomes possible to decrease the turning moment produced by the reaction force at the time of the push/pull driving of the working-object so as to turn the engaging member pedestal. As a result, the strength of the guide rail can be small, and the replacing support can be made smaller in size and lighter in weight.

Incidentally, both the engaging member pedestal and the engaging member having the above-mentioned constructions can be passed through the space below the metal mold placed on the metal mold replacing support by changing over the engaging member to the disengagement position or to the retreat position lower than the disengagement position. Therefor, it becomes possible to put the method and the apparatus for replacing the working-object into practice by arranging the replacing supports provided on its foreside and backside with the working-object receiving surfaces respectively, in the space behind the processing machine.

BRIEF DESCRIPTION OF THE DRAWINGS

FIGS. 1 through 17 show embodiments of the present invention;

FIGS. 1 through 9 show a first embodiment;

FIG. 1 is a front view of a metal mold (a working-object) replacing apparatus of an injection molding machine (a processing machine);

FIG. 2 is a plan view of the ditto apparatus;

FIG. 3 is a left side view of the ditto apparatus;

FIG. 4 is a vertical sectional view taken along IV—IV directed line in FIG. 2 and showing such a condition that a push/pull engaging member pedestal has been advanced toward the metal mold;

FIG. 5 is a partially enlarged view showing enlarged portions of the plan view of FIG. 2;

FIG. 6 is a vertical sectional view taken along VI—VI directed line in FIG. 1;

FIG. 7 is a vertical sectional view taken along VII—VII directed line in FIG. 4;

FIG. 8 is a schematic plan view for explaining the die mold replacing procedure;

FIG. 9 is a perspective view for explaining the principal portion of the ditto procedure;

FIGS. 10 through 13 show variants of the first embodiment respectively;

FIG. 10 is a view showing a variant of a push/pull engaging member correspondingly to FIG. 4;

FIG. 11 is a variant showing an engaged portion of the metal mold correspondingly to FIG. 4;

FIG. 12 is a view showing a push/pull drive device correspondingly to FIG. 6;

FIG. 13 is a view showing various examples of a changeover operation of an engaging member;

FIGS. 14 through 17 show a second embodiment;

FIG. 14 is a plan view of a metal mold replacing apparatus;

FIG. 15 is a view taken along XV—XV directed line in FIG. 14;

FIG. 16 is a view taken along XVI—XVI directed line in FIG. 14;

FIG. 17 is a schematic view for explaining the metal mold replacing procedure;

FIG. 19 is a plan view of a metal mold replacing apparatus;

FIG. 20 is a vertical sectional view taken along XX—XX directed line in FIG. 19; and FIG. 21 is a view corresponding to FIG. 9.

DESCRIPTION OF THE PREFERRED EMBODIMENTS

Figure 4:
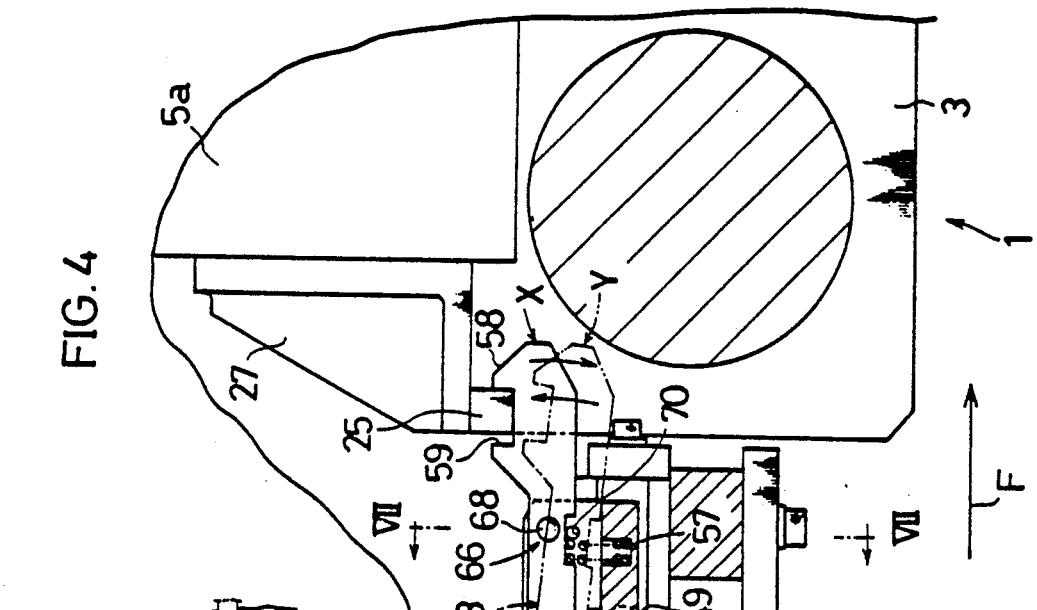

Now the embodiments of the present invention will be explained with reference to the attached drawings hereinafter.

FIRST EMBODIMENT

FIGS. 1 through 9 show a first embodiment.

Firstly the whole construction of a metal mold replacing apparatus 2 of an injection molding machine 1 as a processing machine will be explained with reference to the front view of FIG. 1, the plan view of FIG. 2 and the left side view of FIG. 3. Incidentally, for the sake of the explanation about the arrangement directions of the metal mold replacing apparatus 2, the right side is defined as the foreside F and the left side is defined as the backside B in FIG. 2.

The injection molding machine 1 is adapted to mount various kinds of metal molds having different width dimensions between a fixed plate 3 and a movable plate 4. The metal mold replacing apparatus 2 is arranged on the backside B of the injection molding machine 1. The metal mold replacing apparatus 2 is provided with a stationary metal mold replacing support 6 and is used for replacing a first metal mold 5a mounted on the injection molding machine 1 with another kind of second metal mold 5b.

That is, when the first metal mold 5a is brought into the injection molding machine 1, it is moved from the metal mold replacing support 6 to the space between the fixed plate 3 and the movable plate 4 through a pre-roller device 7 and a conveyance roller device 8 in order so as to be fixedly secured by means of a plurality of hydraulic clamps 10 after being positioned by means of a positioning cylinder 9. To the contrary, when the first metal mold 5a is brought out of the injection molding machine 1, it is moved to the metal mold replacing support 6 through the conveyance roller device 8 and the pre-roller device 7 in order after releasing the clamped condition of the hydraulic clamps 10. Then, the first metal mold 5a is moved outside the metal mold replacing support 6 and subsequently the second metal mold 5b is brought into the injection molding machine 1.

The metal mold replacing support 6 is provided on its upper surface with a metal mold moving passage 12 extended in the fore and back direction (in the direction along the arrows F-B). The moving passage 12 comprises a large number of short rollers 13 arranged side by side in the fore and back direction on one side (the left side in FIG. 3) of the metal mold replacing support 6 and a large number of long rollers 14 arranged side by side in the fore and back direction on the other side (the right side in FIG. 3) of the metal mold replacing support 6. The foreside F portion of the upper end surfaces of the rollers 13, 14 is provided for a first receiving surface 15 for the metal mold, and the backside B portion thereof is provided for a second receiving surface 16 for the metal mold. Incidentally, since a floor member 17 of a mezzanine is overhung in the space above the back portion of the metal mold replacing support 6, the metal mold bring-in and bring-out operation relative to the metal mold replacing support 6 is carried out on the first receiving surface 15 on the foreside.

The metal mold replacing support 6 is provided with a push/pull drive means 18 which pushes and pulls the respective metal molds 5a, 5b in the fore and back direction. The push/pull drive means 18 is provided with an electrically driven type push/pull drive device 19 fixed to the back of the metal mold replacing support 6, a push/pull engaging member pedestal 20 adapted to be moved in the fore and back direction between both the short and the long rollers 13, 14, a push/pull transmission member 21 (refer to FIG. 4) for interlockingly connecting the push/pull drive device 19 and the push/pull engaging member pedestal 20, a guide rail 22 provided in the fore and back direction so as to guide the pushing and the pulling of the push/pull transmission member 21 and the engaging member pedestal 20 and a push/pull engaging member 23 supported by the pedestal 20. The engaging member 23 is adapted to be engaged with respective engaged portions 25, 26 of the respective metal molds 5a, 5b. These engaged portions 25, 26 are projected downward from brackets 27, 27 fixedly secured to the back portion of the respective metal molds 5a, 5b. Further, the metal mold replacing support 6 is provided at the other side (the right side in FIG. 3) with an electrical control panel 28 and a push-button control box 29.

Component elements of the above-mentioned push/pull drive means 18 will be explained more concretely.

Firstly the push/pull drive device 19 and the push/pull transmission member 21 will be explained with reference to FIGS. 4 and 6.

Figure 6:
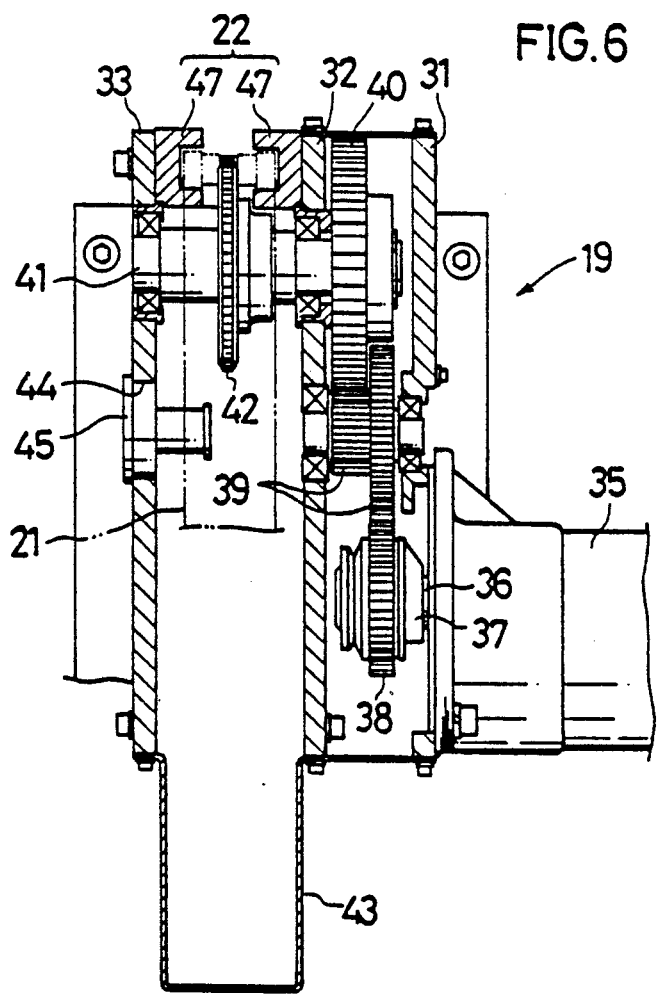
Figure 8:
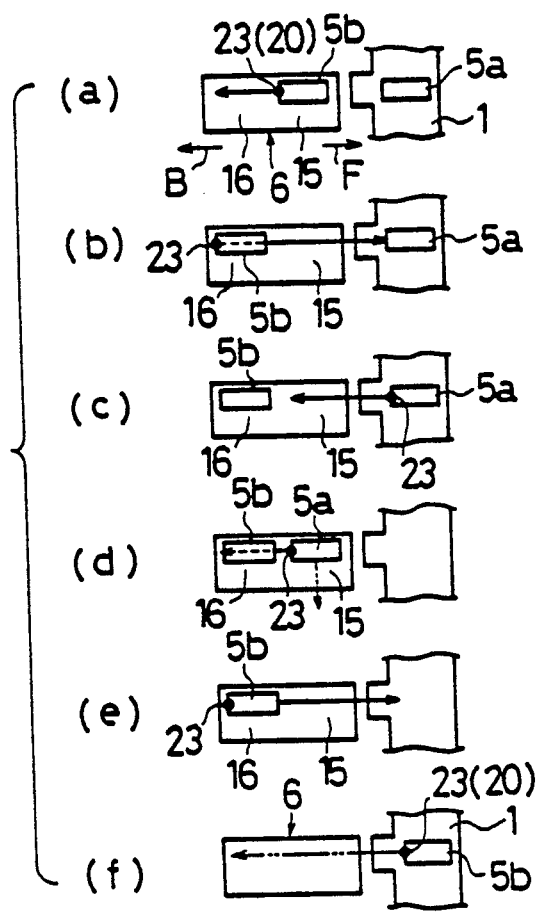

As shown in FIG. 6, the push/pull drive device 19 is provided with three brackets 31, 32, 33. A normally and reversely operable electric motor 35 equipped with a reduction gear is fixed to the right bracket 31. A first gear 38 is connected to an output shaft 36 of the motor 35 through an overload preventive friction clutch 37. The first gear 38 is interlockingly connected to a sprocket wheel 42 through a second gear 39 for speed reduction, a third gear 40 and a rotary shaft 41. The push/pull transmission member 21 composed of a chain (refer to FIG. 4) is engaged with the sprocket wheel 42. The push/pull transmission member 21 of the chain can be stored under the bent condition within a receiving box 43 provided between both the brackets 32, 33.

Incidentally, the left bracket 33 and the intermediate bracket 32 are formed in the same configuration and in the same size to each other. A covering member 45 is attached to a bearing mounting hole 44 of the left bracket 33. Therefore, in case that a push/pull drive device having a right and left symmetrical construction relative to the push/pull drive device 19 shown in FIG. 6 is manufactured, it becomes possible to use the brackets 31, 32, 33 in common so that it can be enough only to shift the right bracket 31 to the left side position of the left bracket 33.

Then, the engaging member pedestal 20, the push/pull transmission member 21, the guide rail 22 and the engaging member 23 will be explained with reference to FIGS. 4, 5 and 7.

The guide rail 22 comprises two rail members 47, 47 having C-shaped cross sections and arranged so as to extend in the fore and back direction in such a manner that their rail grooves 48, 48 face to each other. The engaging member pedestal 20 is arranged between both the rail members 47, 47 so as to be movable in the fore and back direction along the rail grooves 48, 48 through foreside and backside guide rollers 49, 50 supported rotatably by the lower portion thereof 20.

The push/pull transmission member 21 composed of the chain comprises links 52 and guide rollers 53 provided at opposite ends of pivot pins of the respective links 52, and the respective guide rollers 53 are inserted into the rail grooves 48, 48 rollingly. The push/pull transmission member 21 is connected at its fore end to the back portion of the engaging member pedestal 20.

The engaging member 23 is inserted into a receiving groove 55 of the engaging member pedestal 20 and supported vertically swingably by the pedestal 20 through a pivot pin 56. The foreside swinging portion of the engaging member 23 is resiliently urged toward the upside engagement position X by means of a spring 57. The foreside portion of the engaging member 23 is composed of a cam surface 58 inclined forward and downward and an engaging groove (an engaging portion) 59 opened upward arranged on the foreside and on the backside thereof 23 respectively.

The push/pull drive means 18 having the above-mentioned construction functions as follows.

As illustrated by the solid line in FIG. 4, when the engaging groove 59 of the engaging member 23 is engaged with the engaged portion 25 of the metal mold 5a, the sprocket wheel 42 of the push/pull drive device 19 is turned clockwise so as to push the engaging member pedestal 20 toward the foreside F through the push/pull transmission member 21. As the engaging member pedestal 20 is advanced, firstly the cam surface 58 of the engaging member 23 is brought into contact with the lower surface of the engaged portion 25 and then the foreside portion of the engaging member 23 is swung downward against the spring 57 by means of downward reaction force acting from the engaged portion 25 to the cam surface 58. Subsequently, when the engaging groove 59 reaches the engaged portion 25 following the advancement of the engaging member pedestal 20, the foreside portion of the engaging member 23 is swung upward by means of the resilient force of the spring 57 so that the engaging groove 59 can be engaged with the engaged portion 25.

When the engaged condition is released, an actuator 61 of a pneumatic cylinder type fixedly secured to the pre-roller device 7 is actuated extendedly so as to raise a pushing pin 63 of the engaging member pedestal 20 through a pushing member 62. As a result, as illustrated by an alternate long and two short dashes line in FIG. 4, the backside portion of the engaging member 23 is swung upward and the foreside portion thereof 23 is swung downward so that the engaging member 23 can be changed over to the disengagement position Y lower than the lower surface of the engaged portion 25. When the sprocket wheel 42 of the push/pull drive device 19 is turned counterclockwise under that condition, the engaging member pedestal 20 is pulled toward the backside B through the push/pull transmission member 21 so that the engagement between the engaging groove 59 and the engaged portion 25 can be released.

In this embodiment, in order to enable the engaging member pedestal 20 and the engaging member 23 to pass through the space below the respective metal molds 5a, 5b, both the engaging member pedestal 20 and the engaging member 23 changed over to the disengaged position Y are arranged at the lower positions than the height positions of the metal molds 5a, 5b and the engaged portions 25, 26 and further there is provided a locking means 66 for holding the engaging member 23 at the disengagement position Y.

Figure 7:
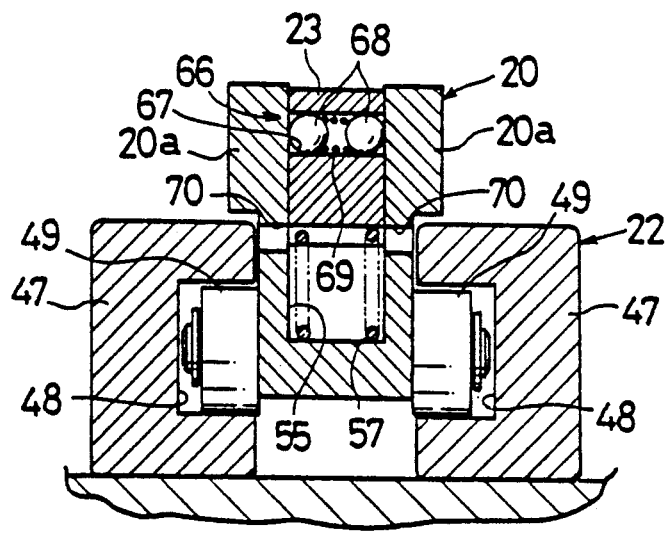

As shown mainly in FIG. 7, the locking means 66 has a following construction.

A through port 67 is formed in the foreside portion of the engaging member 23 so as to extend in the thickness direction, and a pair of locked members 68, 68 composed of balls are accommodated within the through port 67. The locked members 68, 68 are resiliently urged toward both side walls 20a, 20a of the engaging member pedestal 20 by means of a resilient means 69 composed of a compression spring. Locking portions 70, 70 composed of fitting holes are formed in both the side walls 20a, 20a. When the engaging member 23 is changed over to the disengagement position Y as shown by the alternate long and two short dashes line in FIG. 4, the locked members 68 composed of the balls are held in the respective locking portions 70, 70 so as to be secured to the engaging member pedestal 20.

Figure 5:
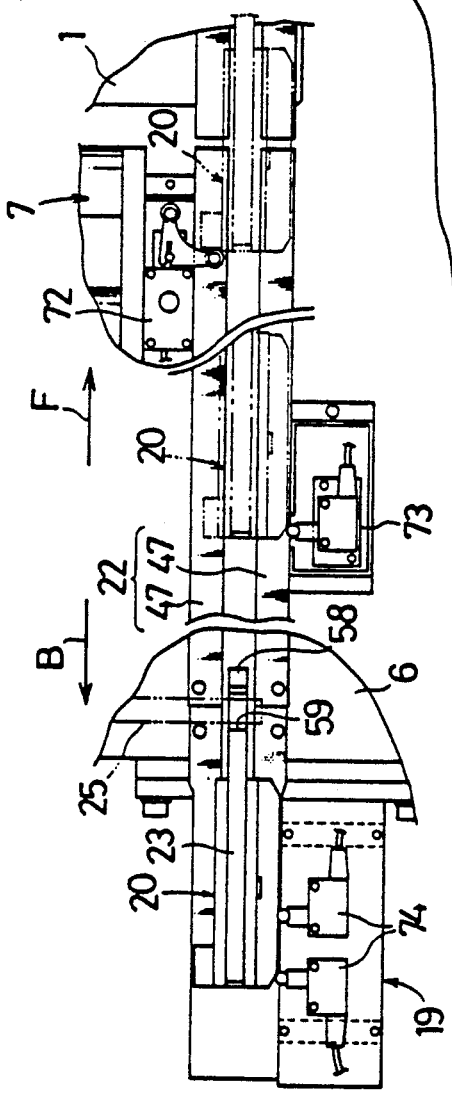

Further, as shown in FIGS. 5 and 2, in order to stop the driving of the push/pull drive device 19 when the respective metal molds 5a, 5b are conveyed to predetermined positions by means of the engaging member pedestal 20, there are three limit switches 72, 73, 74 at the foreside position, at the middle position and at the backside position respectively.

When the engaging groove 59 of the engaging member 23 is advanced to such a position as to be engaged with the engaged portion 25 of the metal mold 5a, the foreside limit switch 72 serves to detect the advanced position of the engaging member pedestal 20 and to stop the rotation of the electric motor 35 so as to stop the engaging member pedestal 20. When the metal mold 5a is retreated from the injection molding machine 1 to the first receiving surface 15 through the engaging member 23 and the engaging member pedestal 20, the middle limit switch 73 serves to detect the retreated position of the engaging member pedestal 20 and to stop the rotation of the electric motor 35 so as to stop the engaging member pedestal 20. When the metal mold 5a is retreated from the first receiving surface 15 to the second receiving surface 16 through the engaging member 23 and the engaging member pedestal 20, the backside limit switch 74 serves to detect the retreated position of the engaging member pedestal 20 and to stop the rotation of the electric motor 35 so as to stop the engaging member pedestal 20.

Further, as shown in FIGS. 1 and 2, in order to prevent the metal mold 5a or 5b from falling down from the metal mold replacing support 6 when being moved toward the foreside F from the each receiving surface 15, 16 under the disengaged condition from the engaging member 23, the stopper cylinders 76, 77 of the pneumatic cylinder type are arranged at the foreside positions of the respective receiving surfaces 15, 16.

Then, the procedure for replacing the used the metal mold 5a mounted on the injection molding machine 1 with the new metal mold 5b will be explained with reference to FIGS. 8 and 9 and FIGS. 1 and 2 along the following items (1) through (6).

(1) As shown in FIG. 8(a), firstly the new metal mold 5b is brought onto the first receiving surface 15 of the metal mold replacing support 6 from the metal mold storage place by means of an overhead travelling crane or a fork lift. Under this condition, the engaging member pedestal 20 is retreated to the backside position of the the metal mold replacing support 6 so that the engaging member 23 can be changed over to the upside engagement position X. Then, the engaging member pedestal 20 is advanced toward the foreside F so that the engaging member 23 can be automatically engaged with the engaged portion 26 of the metal mold 5b. Subsequently, the engaging member pedestal 20 is retreated toward the backside B so that the metal mold 5b can be moved to the second receiving surface 16.

(2) As shown in FIG. 8(b), when the engaging member 23 is pushed down by hands of an operator and locked in the pushed down condition by means of the locking means 66 and then the engaging member pedestal 20 and the engaging member 23 are advanced toward the foreside F passing through the space below the metal mold 5b so as to reach the engaging position with the metal mold 5a, the advancement thereof 20, 23 is stopped by the actuation of the foreside limit switch 72. Subsequently, the engaging member 23 is pushed up by the hands so that the locked condition by the locking means 66 can be released and is engaged with the metal mold 5a.

Figure 9:
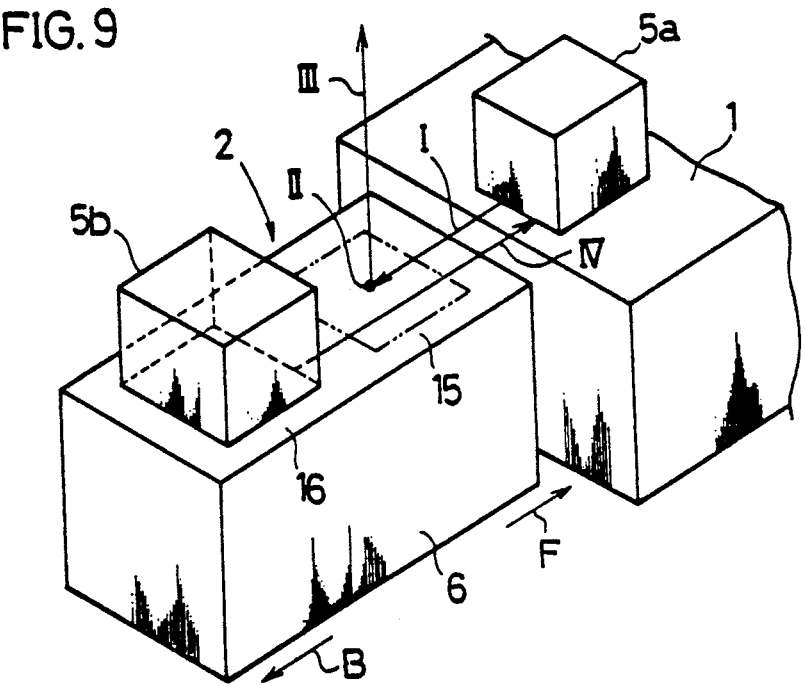

(3) As shown in FIG. 8(c), when the metal mold 5a is retreated toward the backside B by means of the engaging member pedestal 20 and the engaging member 23 and reaches the receiving position on the first receiving surface 15, the retreat thereof 20, 23 is stopped by the actuation of the middle limit switch 73 (refer to the step I in FIG. 9).

(4) As shown in FIG. 8(d), firstly engaging member 23 is pushed down by the hands so as to be locked in the pushed down condition by means of the locking means 66 and to be disengaged from the metal mold 5a (refer to the step II in FIG. 9), and the first metal mold 5a is brought from the first receiving surface 15 by means of the overhead travelling crane and the like (refer to the step III in FIG. 9). Subsequently, when the engaging member pedestal 20 and the engaging member 23 are retreated toward the backside B passing through the space below the metal mold 5b and reaches the engaging position with the metal mold 5b, the retreat thereof 20, 23 is stopped by the actuation of the backside limit switch 74. Then, the engaging member 23 is pushed up by the hands so that the locked condition by the locking means 66 can be released and is engaged with the metal mold 5b.

(5) As shown in FIG. 8(e), when the metal mold 5b is advanced toward the foreside F by means of the engaging member pedestal 20 and the engaging member 23 and reaches a predetermined position in the injection molding machine 1, the advancement of the engaging member pedestal 20 is stopped by the actuation of the foreside limit switch 72 and the condition shown in FIG. 8(f) is presented (refer to the step IV in FIG. 9).

(6) In FIG. 8(f), firstly the engagement between the engaging member 23 and the metal mold 5b is released by the extension of the actuator 61 and the engaging member 23 is locked at the disengagement position Y by means of the locking means 66 (refer to the condition illustrated by the alternate long and two short dashes line in FIG. 4).

Then, the engaging member pedestal 20 is retreated to the back portion position of the metal mold replacing support 6.

Incidentally, in order to further facilitate the metal mold replacing operation by automating the engaging operation and the disengaging operation of the engaging member 23, it is preferable to provide the above-mentioned construction with an actuator for the engaging operation and another actuator for the disengaging operation at the respective three stopping positions of the engaging member pedestal 20 in the fore and back direction.

FIGS. 10 through 13 show variants of the first embodiment respectively, and component elements having the same constructions as those in the first embodiment are designated by the same symbols.

FIRST VARIANT

FIG. 10 shows variants of the engaging member pedestal 80 and the engaging member 81.

The engaging member 81 is supported vertically swingably at its back portion by the engaging member pedestal 80 through the pivot pin 82, and the foreside swinging portion of the engaging member 81 is adapted to be changed over to the engagement position X (illustrated by the solid line), to the disengagement position Y (illustrated by the alternate long and short dash line) and to the retreat position Z (illustrated by the alternate long and short dashes line) lower than the disengagement position Y in order from above.

The engaging member 81 is resiliently urged toward the engagement position X by means of the spring 84 so as to be engaged with the engaged portion 25 of the metal mold 5a and is changed over from the engagement position X to the disengagement position Y against the resilient force of the spring 84 when the pushing pin 83 is raised by means of an actuator (not illustrated). When the foreside portion of the engaging member 81 changed over to the disengagement position Y is pushed down by means of a man power of an operator or a cylinder for a locking operation, the locked members 86 composed of balls of the locking means 85 are fitted into the locking portions 87 formed of engaging holes so as to hold the engaging member 81 at the retreat position Z. Incidentally, the resilient force of the spring 84 can be adjusted by means of an adjusting bolt 88.

SECOND VARIANT

FIG. 11 shows a variant of the engaged portion 90 of the metal mold 5a. This variant is different from the one provided with the engaged portion 25 projected from the back surface of the metal mold 5a through the bracket 27 as shown in FIG. 10, but it is provided with the engaged portion 90 projected directly from the lower surface of the metal mold 5a.

THIRD VARIANT

Figure 12:
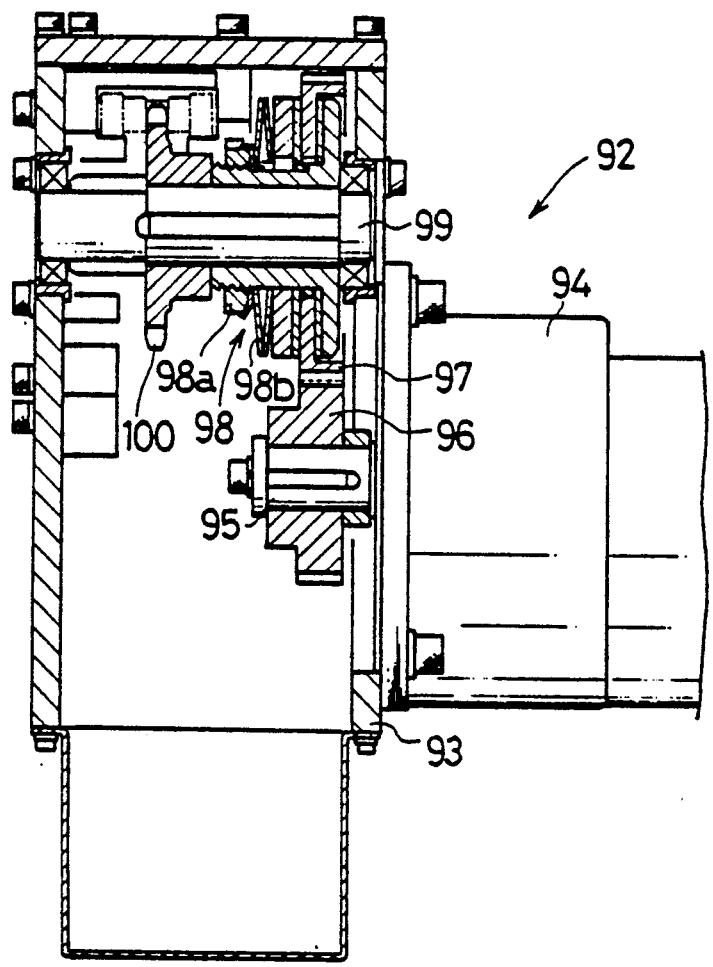

FIG. 12 shows a variant of the push/pull drive device 92. The output shaft 95 of the electric motor 94 fixed to a support plate 93 is interlockingly connected to the sprocket wheel 100 through the first gear 96, the second gear 97 for the speed reduction, the overload preventive friction clutch 98 and the rotary shaft 99 in order. Resilient force exerted by coned disk springs 98b of the friction clutch 98 is adapted to be finely adjusted by means of an adjusting nut 98a.

FOURTH VARIANT

Figure 13:
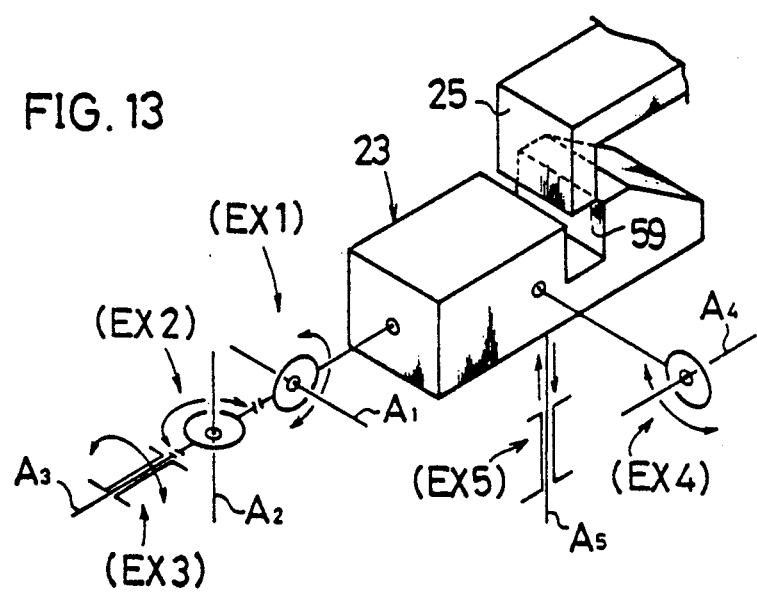

FIG. 13 shows various kinds of changeover manners of the engaging member 23 schematically.

The (EX1) in the drawing is a schematic view corresponding to FIG. 4 according to the above-mentioned first embodiment and shows the one provided with the engaging member 23 adapted to be swung vertically about a horizontal support axis $A_1$. The engaging groove 59 of the engaging member 23 may at least face upward so as to be engaged with the engaged portion 25 from below under the changed over condition to the engagement position, and the following (EX2) through (EX5) variants can be presented.

The (EX2) shows the one provided with the engaging member 23 adapted to be swung horizontally about a vertical support axis $A_2$.

The (EX3) shows the one provided with the engaging member 23 adapted to be turned about a support axis $A_3$ extending in the fore and back direction.

The (EX4) shows the one provided with the engaging member 23 adapted to be swung vertically about a support axis $A_4$ extending in the fore and back direction.

The (EX5) shows the one provided with the engaging member 23 adapted to be moved vertically along a vertical support axis $A_5$.

Further, the above-mentioned first embodiment may be varied as follows.

The spring resiliently acting on the engaging member 23 may be a spiral spring.

Both engaging and disengaging operations of the engaging member 23 may be performed by means of an electromagnetic actuator, and which actuator may be fixed to the engaging member pedestal 20.

The disengaging operation of the engaging member 23 may be performed by a gravity acting on the engaging member 23 and only the engaging operation may be performed by means of the actuator.

The engaging member 23 is locked not only at the disengagement position but also at the engagement position and at the retreat position by means of the locking means.

The push/pull transmission member 21 of the engaging member pedestal 20 may be composed of a bendable and storable wire.

The metal mold replacing support 6 may be provided with not less than three metal mold receiving surfaces. In this case, other receiving surfaces besides the two surfaces may be used for temporary metal mold placing spots and/or shunt spots.

The metal mold replacing apparatus 2 according to the above-mentioned first embodiment has several advantages as described later in comparison with the known embodiment (refer to FIG. 18) and the conventional embodiments (after to FIGS. 19 through 21).

Figure 18:
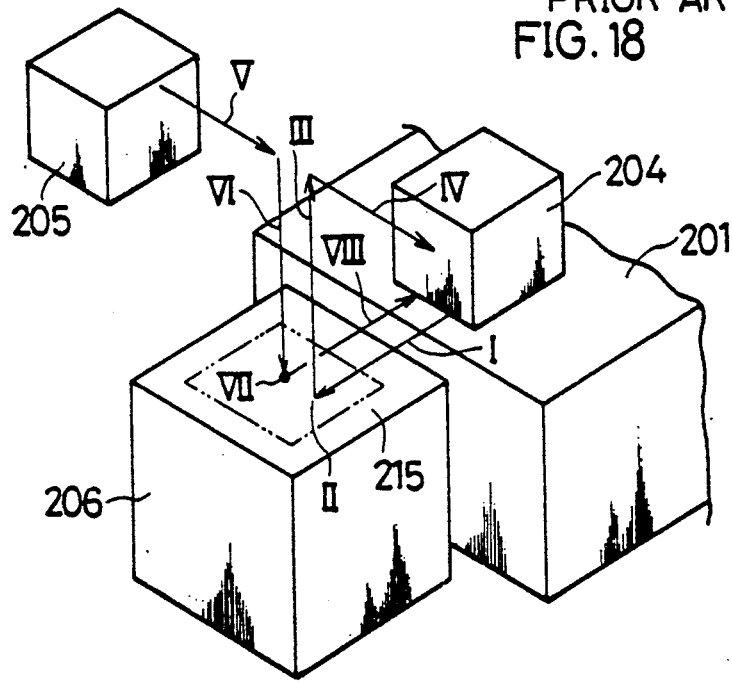
FIG. 18 is a view showing a known embodiment correspondingly to FIG. 9.

In the known embodiment shown in FIG. 18, a stationary metal mold replacing support 206 is arranged in the space behind an injection molding machine 201 and is provided with only one metal mold receiving surface 215. The operation for replacing a used metal mold 204 mounted on the injection molding machine 201 with a new metal mold 205 is carried out by the following steps I through VIII in the drawing.

(Step I) The used metal mold 204 is brought from the injection molding machine 201 to the receiving surface 215.

(Step II) The metal mold 204 is engaged with a hook of a crane.

(Step III) The metal mold 204 is lifted by means of the crane.

(Step IV) The metal mold 204 is brought to a metal mold storage spot by means of the crane.

(Step V) The new metal mold 205 is lifted above the receiving surface 215 by means of the crane.

(Step VI) The metal mold 205 is lowered onto the receiving surface 215 by means of the crane.

(Step VII) The metal mold 205 is released from the hook of the crane.

(Step VIII) The metal mold 205 is brought into the injection molding machine 201 from the metal mold replacing support 206.

Since the known embodiment requires eight steps for the metal mold replacing working, it takes a long time for the replacing working. Further, since it requires to use two cranes separately and properly for moving the used metal mold and the new metal mold, the replacing working is complicated.

Figure 21:
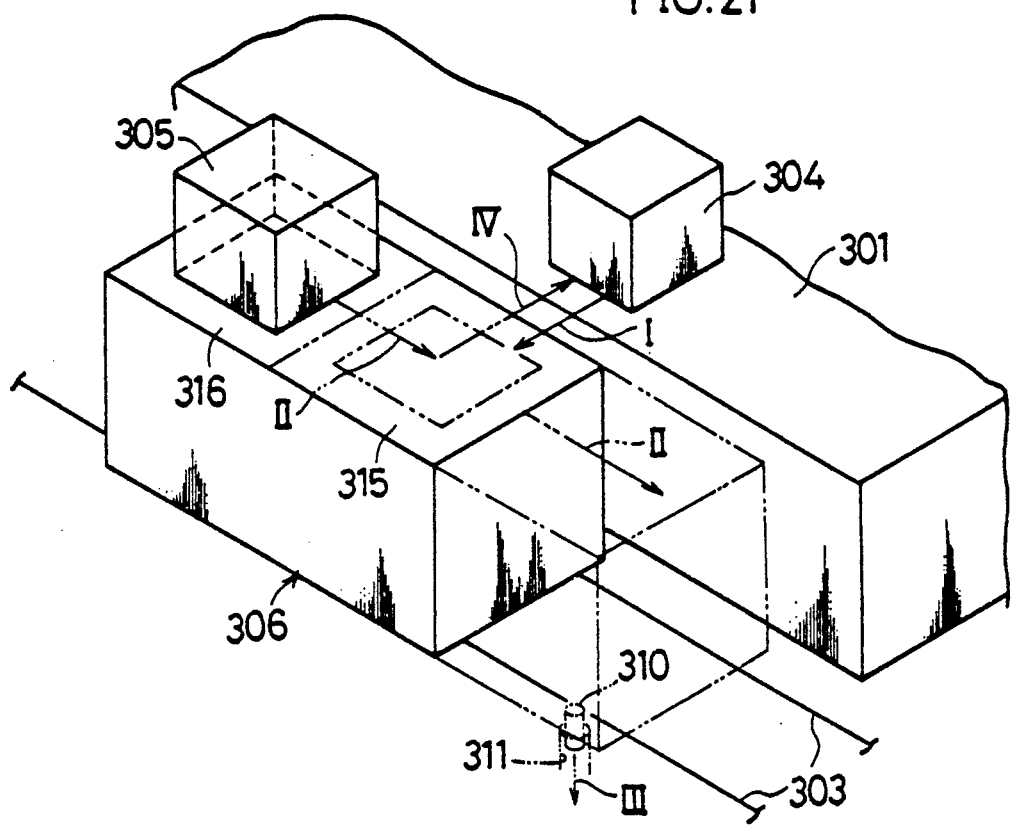
FIGS. 19 through 21 show a conventional embodiment.
Figure 19:
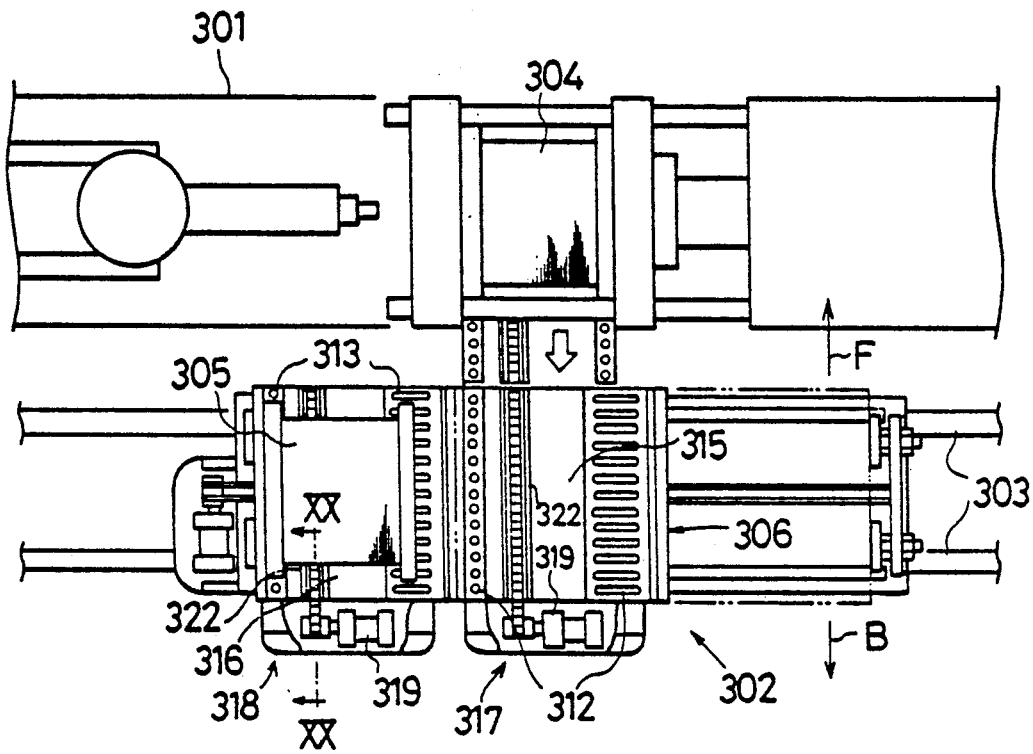
Figure 20:
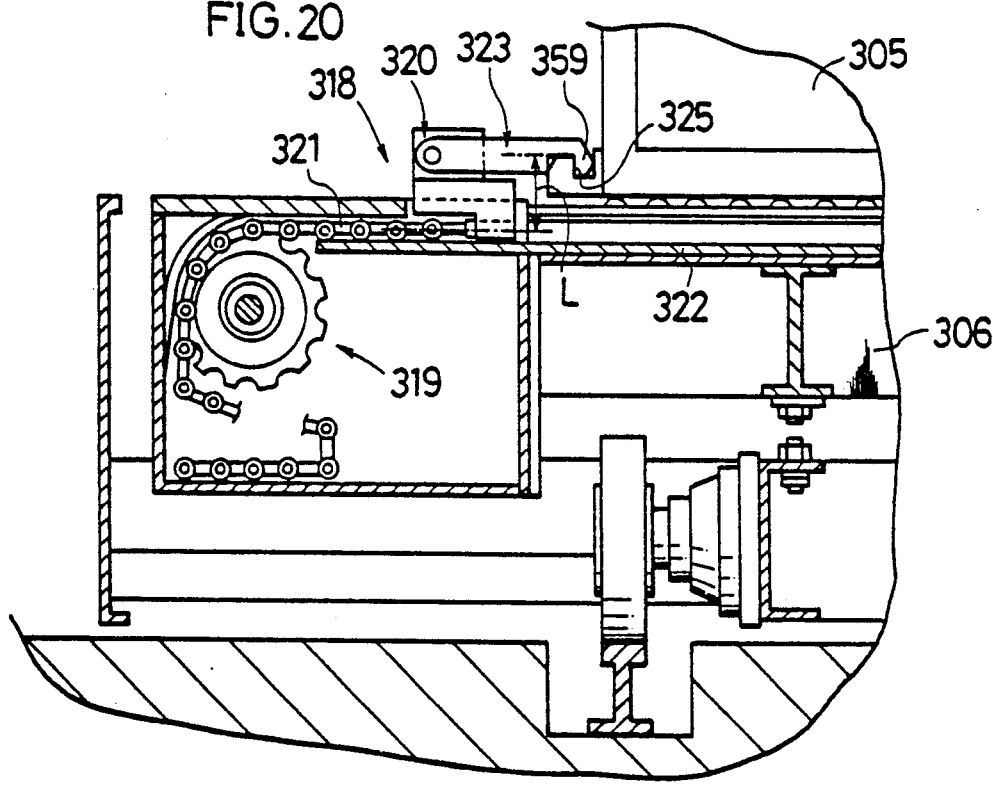

The conventional embodiment shown in FIGS. 19 through 21 is constructed as follows.

Carriage rails 303 are arranged in the backside B space behind the injection molding machine 301 so as to extend right and left, and the metal mold replacing support 306 of a carriage type is adapted to be moved along the rails 303. The metal mold replacing support 306 is provided with two metal mold receiving surfaces 315, 316 arranged side by side. The metal mold moving passages 312, 313 and the push/pull drive means 317, 318 are provided for the respective receiving surfaces 315, 316 correspondingly. The respective push/pull drive devices 319, 319 of the push/pull drive means 317, 318 are disposed at the back portion of the support 306. The respective metal mold moving passages 312, 313 and the respective guide rails 322, 322 for the respective push/pull drive means 317, 318 are arranged so as to extend in the fore and back direction.

The operation for replacing the used metal mold 304 mounted on the injection molding machine 301 with the new metal mold 305 is carried out by the following steps I through IV in FIG. 21.

(Step I) The metal mold 304 mounted on the injection molding machine 301 is brought out to the first receiving surface 315 on the right side.

(Step II) The support 306 is moved right along the carriage rails 303.

(Step III) When the new metal mold 305 previously placed on the second receiving surface 316 on the left side is moved and reaches the metal mold replacing position on the injection molding machine 301, the movement of the support 306 is stopped and the support 306 is secured by inserting a positioning pin 310 of the lower portion of the support 306 into an engaging hole 311 of a factory floor.

(Step IV) The metal mold 305 is brought into the injection molding machine 301 from the second replacing surface 316 on the left side.

There are, however, following problems associated with the above-mentioned conventional embodiment.

That is, since the metal mold replacing support 306 on which two metal molds 304, 305 are placed is affected with a large inertial force due to the large weight when being moved, the moving and the stopping have to be done slowly in order to prevent a breakage of the positioning pin 310 at the time of the movement and the stoppage. Therefore, it takes a long time for moving and stopping the support 306.

Further, the movement of the heavy support 306 consumes large amount of energy.

In comparison with the known embodiment and the conventional embodiment, the metal mold replacing procedure of the first embodiment of the present invention is different in the following steps I through IV in FIG. 9.

(Step I) The first metal mold 5a mounted on the injection molding machine 1 is brought out to the first receiving surface 15 on the right side.

(Step II) The hook of the overhead travelling crane is engaged with the first metal mold 5a.

(Step III) The first metal mold 5a is lifted by means of the crane.

(Step IV) The second metal mold 5b on the second receiving surface 16 is brought in to the injection molding machine 1.

Therefore, the first embodiment of the present invention has following advantages in comparison with the known embodiment shown in FIG. 18.

Since this embodiment requires only four steps in comparison with the known embodiment which requires eight steps for the metal mold replacement, it is possible to shorten the time required for the metal mold replacing working and to enhance the operating ratio of the injection molding machine 1. Further, differently from the known embodiment in which two cranes are employed separately and properly for the conveyance of the metal mold to the metal mold replacing support 206 and to the metal mold storage spots, this embodiment employs only one crane. Accordingly, the operation for conveying the metal mold is facilitated.

Further, this embodiment has the following advantages in comparison with the conventional embodiment shown in FIGS. 19 and 21.

In the conventional embodiment, it is necessary to move the metal mold replacing support 306 having a large weight. To the contrary, since this embodiment is required only to move the engaging member pedestal 20 having a very small weight, the inertial force at the time of movement can be small. Accordingly, the starting of the movement and the stopping can be done quickly and it is possible to shorten the time for replacing the metal mold correspondingly. Further, since this embodiment is not required to move the support having the large weight, it is possible to save an energy required for the movement and to reduce the operating costs.

SECOND EMBODIMENT

FIGS. 14 through 17 show the second embodiment in which the push/pull drive means is applied to the metal mold replacing support of the carriage type.

Figure 14:
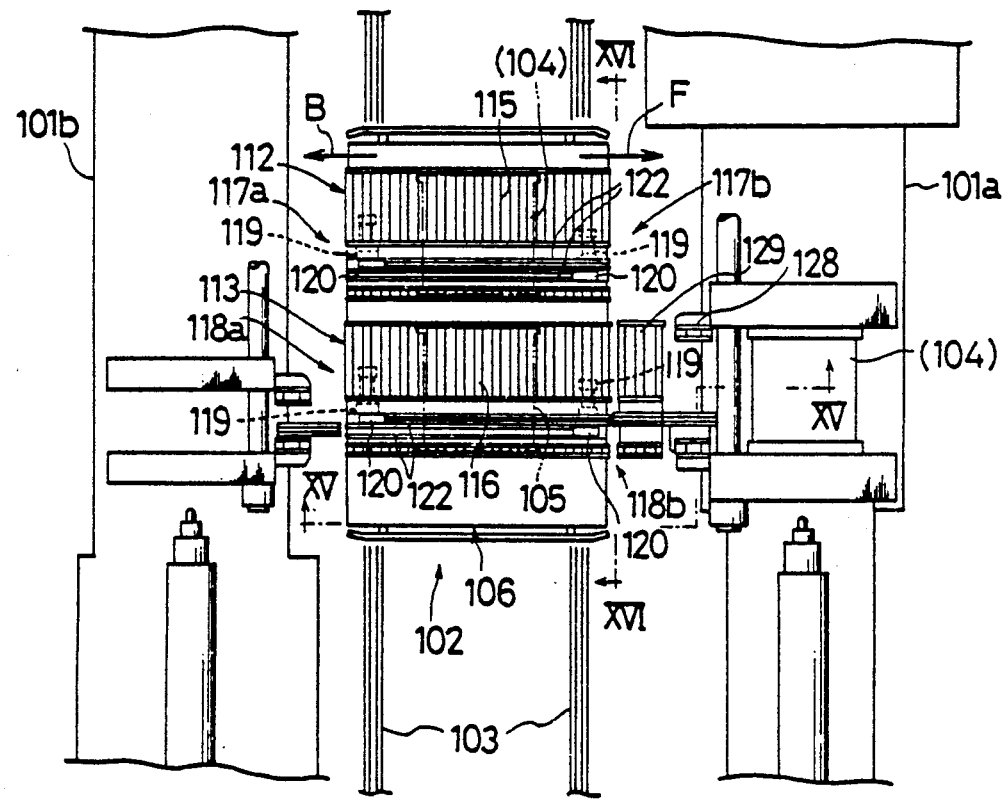

Firstly, the whole construction of the metal mold replacing apparatus 102 will be explained with reference to the plan view of FIG. 14, the front view of FIG. 15 and the right side view of FIG. 16. Incidentally, for the sake of the following explanation about the arrangement directions of the metal mold replacing apparatus 102, the right side is defined as the foreside F and the left side is defined as the backside B in FIG. 14.

The carriage rails 103 are arranged between two injection molding machines 101a, 101b on the foreside and on the backside so that the metal mold replacing support 106 can be moved along the rails 103. The support 106 is provided at its lower portion with a plurality of running wheels 107, two wheels 107 of which are adapted to be driven by means of an electric motor 108 through a driving chain 109. As shown in FIG. 16, the support 106 is adapted to be secured at a predetermined position by fitting the positioning pin 110 into the engaging hole 111 of the factory floor.

The metal mold replacing support 106 is provided with two metal mold moving passages 112, 113 extended in the fore and back direction, and the respective metal mold moving passages 115, 116 are provided at their mid upper surfaces with the metal mold receiving surfaces 115, 116. The respective metal molds 104, 105 placed on the respective receiving surfaces 115, 116 can be brought in and brought out with respect to either of the first injection molding machine 101a on the foreside F and the second injection molding machine 101b on the backside B.

That is, the first receiving surface 115 is provided at their backside and foreside with two push/pull drive means 117a, 117b respectively, and also the second receiving surface 116 is provided at their back portion and fore portion with two push/pull drive means 118a, 118b.

The first push/pull drive means 117a, 118a provided at the back portion are extended forward functionally so as to bring in and bring out the metal mold with respect to the first injection molding machine 101a located on the foreside F. To the contrary, the second push/pull drive means 117b, 118b provided at the fore portion are extended backward functionally so as to bring in and bring out the metal mold with respect to the second injection molding machine 101b located on the backside B.

Those push/pull drive means have substantially the same construction as those in the first embodiment and are provided with the push/pull drive device 119, the push/pull engaging member pedestal 120, the push/pull transmission member (not illustrated), the guide rail 122 and the push/pull engaging member 123 respectively.

Incidentally, the engaging member 123 has the same construction as that shown in FIG. 10 and is adapted to be changed over to the engagement position X, to the disengagement position Y and to the retreat position Z. The engaging member pedestal 120 and the engaging member 123 changed over to the disengagement position Y are lower than the height positions of the lower surfaces of the respective metal molds 104, 105 and the lower surfaces of the engaged portions 125, 126 thereof so that the metal molds placed on the respective moving passages 111, 112 can pass through the space above the engaging member pedestal 120 and the engaging member 123 when the engaging member 123 is disengaged. The respective actuators 161 for changing over the respective engaging members 123 from the engagement position to the disengagement position have substantially the same construction as that shown in FIG. 4 and are disposed at the upper portions of the push/pull drive devices 119.

Figure 17:
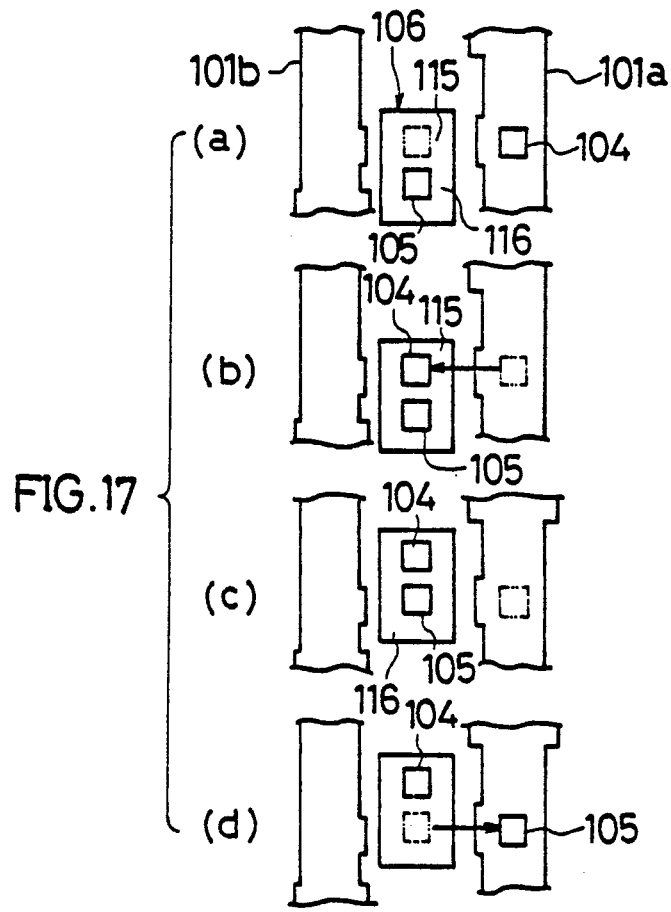

Then, the procedure for replacing the used metal mold 104 mounted on the first injection molding machine 101a with the new metal mold 105 will be explained along the following items (1) through (4) with reference to the above-mentioned respective views and the schematic view of FIG. 17.

(1) As shown in FIG. 17(a), the first receiving surface 115 is put upon the metal mold replacing position of the first injection molding machine 101a by moving the support 106 under such a condition that the second metal mold 105 is placed on the second receiving surface 116. Then, the engaging member 123 of the first push/pull drive means 117a is advanced toward the foreside F so as to be engaged with the first metal mold 104.

(2) Firstly, the engaging member 123 of the push/pull drive means 117b is held under the changed over condition to the lower disengagement position Y on the first receiving surface 115 by means of the actuator 161, and then as shown in FIG. 17(b), the first metal mold 104 in the injection molding machine 101 is moved to the first receiving surface 115 by means of the first push/pull drive means 117a after passing above the engaging member 123 of the second push/pull drive means 117b through pre-rollers 128 and auxiliary rollers 129 in order.

(3) As shown in FIG. 17(c), the second receiving surface 116 is put upon the metal mold replacing position of the first injection molding machine 101a by moving the support 106.

Figure 15:
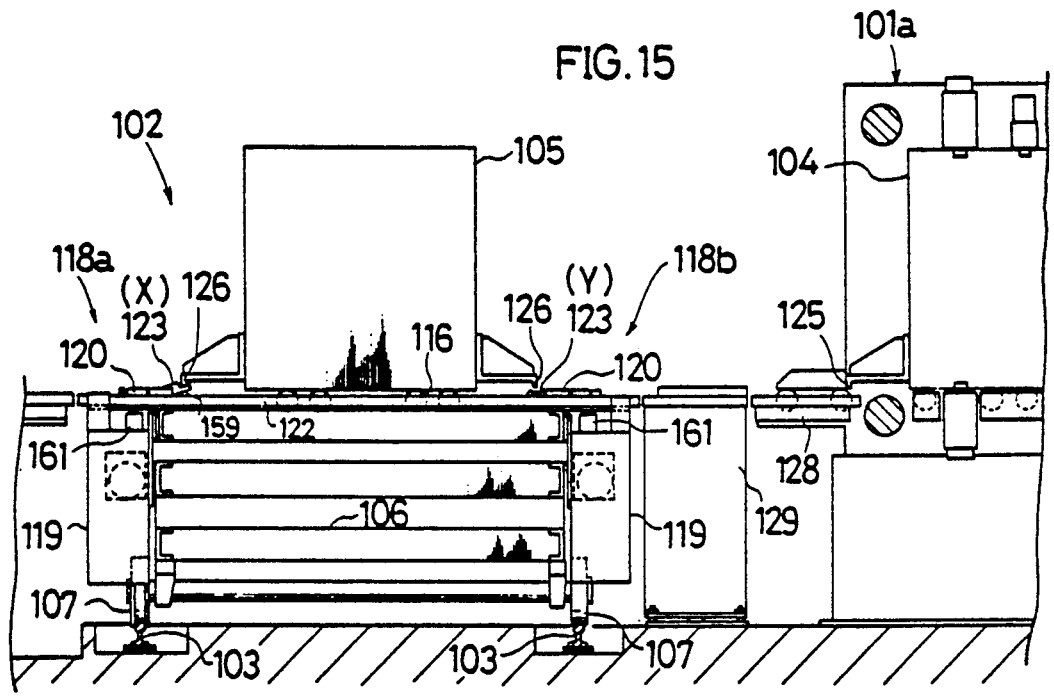
Figure 16:
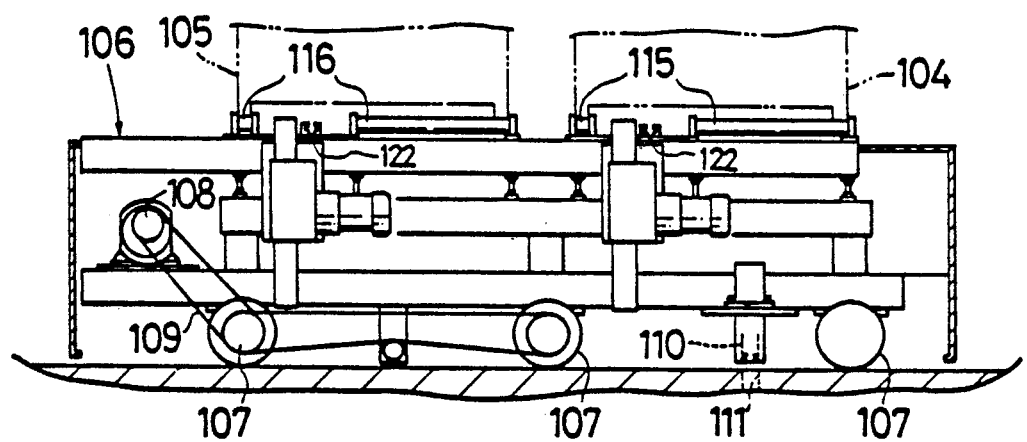

(4) As shown in FIG. 15, firstly the engaging member 123 of the second push/pull drive means 118b is held under the changed over condition to the lower disengagement position Y on the the second receiving surface 116 by means of the actuator 161, and then the engaging member 123 of the first push/pull drive means 118a is engaged with the engaged portion 126 of the second metal mold 105. Subsequently, as shown in FIG. 17(d), the second metal mold 105 is brought in to the injection molding machine 101a by means of the first push/pull drive means 118a.

Incidentally, also with respect to the second injection molding machine 101b on the backside B of the support 106, the metal mold replacement is carried out by the same procedure as mentioned above.

The apparatus of this second embodiment has the following advantages in comparison with the apparatus of the aforementioned conventional embodiment (refer to FIGS. 19 through 21).

That is, in the push/pull drive means 318 of the conventional embodiment, when the metal mold replacement is carried out by employing one metal mold replacing support 306 with respect to two injection molding machines, the support 306 has to be provided with a lifting means which operates to raise and lower the whole of the push/pull drive device 319, the push/pull engaging member pedestal 320 and the engaging member 323. To the contrary, in the present invention, as mentioned above, for example when the metal mold is brought in and brought out by means of the first push/pull drive means 117a, 118a with respect to the first injection molding machine 101a, the metal mold 104 or 105 to be replaced can be passed above the engaging members 123 of the second push/pull drive means 117b, 118b by changing over these engaging members 123 thereof 117b, 118b to the lower disengagement position Y.

Accordingly, since the metal mold replacing support 106 according to the present invention doesn't require the lifting means of the push/pull drive means, the whole construction can be simplified. Further, since it is enough only to change over the engaging member 123 having a small weight in comparison with the lifting means for raising and lowering the push/pull drive means having a large weight, the amount of consumed energy becomes less and the metal mold replacing time can be shortened correspondingly to the time shortened at the time of changing over of the engaging member 123.

Incidentally, though in the first embodiment the stationary metal mold replacing support having two receiving surfaces is provided with one push/pull drive means and in the second embodiment the carriage type metal mold replacing support having two receiving surfaces is provided with four push/pull drive means, of course the push/pull drive means of the present invention may be applied to the metal mold replacing support having one receiving surface like the above-mentioned known embodiment and also to the carriage type support having two receiving surfaces as well as provided with two push/pull drive means like the conventional embodiment.

Further, the present invention may be applied to not only the injection molding machines described in the respective embodiments but also other kinds of processing machines. For example, the case that a metal die replacement is carried out relative to a press machine, the case that work pallets or large works are replaced for a machining center, the case that a quenching pallets are replaced for a processing and treating apparatus such as a quenching furnace and so on may be imagined.

What is claimed is:

1. An apparatus for replacing a machine part of a processing machine comprising:
    a machine part replacing support (6) on which at least one machine part (5a) (5b) having an engaged portion (25) (26) is placed;
    a machine part moving passage (12) provided in the machine part replacing support (6) so as to extend toward the processing machine;
    a push/pull drive means (18) for pushing and pulling the engaged portion (25) (26) of the machine part (5a) (5b) toward and away from the processing machine so as to bring in and bring out the machine part (5a) (5b) with respect to the processing machine (1);
    said push/pull drive means (18) comprising:
    a push/pull drive device (19);
    a push/pull transmission member (21) which is bendable and storable, having opposite fore and back ends and being connected at it back end to the push/pull drive device (19);
    a push/pull engaging member pedestal (20) connected to the fore end of the push/pull transmission member (21);
    a guide rail (22) provided in the machine part replacing support (6) along the machine part moving passage (12) so as to guide the pushing and the pulling for the push/pull transmission member (21) and the engaging member pedestal (20); and
    a push/pull drive engaging member (23) which is supported by the engaging member pedestal (20) so as to swing in a generally vertical plane and provided on a foreside swinging portion with an engaging portion (59) facing upward and adapted to be moved between an upper engagement position (X) and a lower disengagement position (Y) with respect to the engaged portion (25) (26) of the machine part (5a) (5b);
    spring means (57) interposed between said push/pull engaging member (23) and said engaging member pedestal (20) and adapted to resiliently urge the engaging member (23) toward the upper engagement position (X) and to be changed over to the lower disengagement position (Y) by means of an actuator (61) against the resilient force of the spring means (57);
    an actuator (61) attached to a fixed portion of the machine part replacing apparatus having means operatively associated with the push/pull engaging member (23) to move it between its upper engagement position (X) and its lower disengagement position (Y);
    said push/pull engaging member (23) being provided at a leading end portion on the foreside of the engaging portion (59) with a cam surface (58) inclined forward and downward and adapted to be brought into contact with the lower surface of the engaged portion (25) (26); and
    said engaging portion (59) being adapted to be shifted below the height position of the engaged portion (25) (26) under the changed over condition to the disengagement position (Y) and at least to face upward so as to be engaged with the engaged portion (25) (26) from below under the changed over condition to the engagement position (X).

2. An apparatus for replacing machine part of a processing machine as defined in claim 1 wherein
    both the push/pull engaging member (23) and the engaging member pedestal (20) are provided at opposing portions with a locking means (66) which serves to lock the push/pull engaging member (23) at least at one of the engagement position (X), the disengagement position (Y) and a retreat position (Z) lower than the disengagement position (Y).

3. An apparatus for replacing a machine part of a processing machine as defined in claim 2, wherein
    said locking means (66) comprises a locked member (68) provided in the push/pull engaging member (23) so as to be advanced and returned with respect to the engaging member pedestal (20), a resilient means (69) for advancing the locked member (68) to the engaging member pedestal (20) and a locking portion (70) provided in the engaging member pedestal (20) for holding the locked member (68) in the advanced condition.

4. An apparatus for replacing a machine part of a processing machine as defined in claim 3, wherein
    said locked member (68) comprises a ball,
    said resilient means (69) comprises a compression spring, and said locking portion (70) comprises a fitting hole into which the advanced portion of the locked member (68) composed of the ball is fitted.

5. An apparatus for replacing a machine part of a processing machine as defined in claim 1, wherein
    at least two machine part receiving surfaces (15) (16) are arranged on said machine part replacing support (6);
    said machine part moving passage (12) is provided with two machine part receiving surfaces (15) (16) so as to extend toward the processing machine;
    both said engaging member (23) changed over to the disengagement position (Y) and said engaging member pedestal (20) are adapted to be shifted to the positions lower than the height positions of the respective lower surfaces of the machine part (5a) (5b) and the engaged portion (25) (26) thereof.

6. An apparatus for replacing a machine part of a processing machine as defined in claim 1, wherein
    said push/pull drive means are provided two in number per one surface of the machine part receiving surface (115) (116) of the machine part replacing support (106),
    the first push/pull drive means (117a) (118a) is extended in a first direction so as to bring in and bring out the machine part (104) (105) with respect to a first processing machine (101a) located on a first side, the second push/pull drive means (117b) (118b) is extended in a second direction so as to bring in and bring out the machine part (104) (105) with respect to a second processing machine (101b) located on a second side and both the engaging member (123) changed over to the disengagement position (Y) and the engaging member pedestal (120) are adapted to be shifted to the positions lower than the height-positions of the respective lower surfaces of the machine part (104) (105) and the engaged portion (125) (126) thereof.

* * * * *